US010336958B2

(12) United States Patent
Bae et al.

(10) Patent No.: US 10,336,958 B2
(45) Date of Patent: Jul. 2, 2019

(54) SUSTAINABLE BASE OILS FOR LUBRICANTS

(71) Applicant: Resinate Materials Group, Inc., Plymouth, MI (US)

(72) Inventors: Woo-Sung Bae, Midland, MI (US); Jack R. Kovsky, Detroit, MI (US); Rick Tabor, Plymouth, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 0 days.

(21) Appl. No.: 15/686,342

(22) Filed: Aug. 25, 2017

(65) Prior Publication Data

US 2018/0057764 A1 Mar. 1, 2018

Related U.S. Application Data

(63) Continuation of application No. PCT/US2017/045500, filed on Aug. 4, 2017.

(60) Provisional application No. 62/381,039, filed on Aug. 30, 2016.

(51) Int. Cl.
C08G 65/34 (2006.01)
C08G 63/183 (2006.01)
C08G 63/48 (2006.01)
C08G 63/553 (2006.01)
C10M 101/04 (2006.01)
C10M 105/42 (2006.01)
C10M 107/32 (2006.01)
C10M 111/04 (2006.01)
C10M 175/00 (2006.01)
C10M 177/00 (2006.01)

(52) U.S. Cl.
CPC ......... C10M 107/32 (2013.01); C08G 63/183 (2013.01); C08G 63/48 (2013.01); C08G 63/553 (2013.01); C08G 65/34 (2013.01); C10M 101/04 (2013.01); C10M 105/42 (2013.01); C10M 111/04 (2013.01); C10M 175/0016 (2013.01); C10M 177/00 (2013.01); C10M 2203/1006 (2013.01); C10M 2207/2835 (2013.01); C10M 2207/301 (2013.01); C10M 2209/1023 (2013.01); C10M 2223/045 (2013.01); C10N 2220/021 (2013.01); C10N 2220/022 (2013.01); C10N 2230/02 (2013.01); C10N 2230/06 (2013.01); C10N 2240/04 (2013.01); C10N 2240/08 (2013.01); C10N 2240/14 (2013.01); C10N 2240/40 (2013.01); C10N 2240/64 (2013.01); C10N 2270/00 (2013.01); Y02P 20/582 (2015.11)

(58) Field of Classification Search
CPC ...... C08G 63/916; C08K 5/0016; C08K 5/09; C08L 27/06; C08J 2467/03

USPC ........................................... 508/208; 524/306
See application file for complete search history.

(56) References Cited

U.S. PATENT DOCUMENTS

| 2,793,220 | A |   | 5/1957  | Barrett et al. |
|-----------|---|---|---------|----------------|
| 3,000,917 | A |   | 9/1961  | Babayan        |
| 3,413,223 | A |   | 11/1968 | Forbes et al.  |
| 3,637,501 | A |   | 1/1972  | Malec et al.   |
| 4,036,771 | A |   | 7/1977  | Denis et al.   |
| 4,157,990 | A |   | 6/1979  | Lindner et al. |
| 4,371,469 | A |   | 2/1983  | Foglia et al.  |
| 5,057,247 | A |   | 10/1991 | Schmid et al.  |
| 5,138,027 | A |   | 8/1992  | Van Beek       |
| 5,503,762 | A |   | 4/1996  | Bongardt et al.|
| 5,877,255 | A | * | 3/1999  | Gerber ............... C08G 18/4288 428/423.1 |
| 6,281,373 | B1|   | 8/2001  | Sato et al.    |
| 6,855,676 | B2|   | 2/2005  | Li et al.      |
| 7,125,827 | B2|   | 10/2006 | Li et al.      |
| 7,176,169 | B2|   | 2/2007  | Gibb et al.    |
| 2003/0153471 | A1 |  | 8/2003  | Godici et al.  |

(Continued)

FOREIGN PATENT DOCUMENTS

CA     104511 A    4/1907
CA     2381345 A1  3/2001
(Continued)

OTHER PUBLICATIONS

N. Negm et al., IOSR J. Appl. Chem. 7 (2014) 69.
(Continued)

Primary Examiner — Vishal V Vasisth
(74) Attorney, Agent, or Firm — Dilworth IP, LLC

(57) ABSTRACT

Sustainable lubricant compositions made from recycled thermoplastic polyesters and other reclaimed or biorenewable reactants and a method of formulating them are disclosed. The lubricant compositions comprise a polyester base oil, which incorporates recurring units from a digested thermoplastic polyester, a low-molecular-weight polyol, and $C_8$-$C_{24}$ fatty acid. The base oil has a number-average molecular weight within the range of 300 to 5000 g/mol, a hydroxyl value less than 50 mg KOH/g, and a viscosity at 40° C. less than 5000 cSt. Some of the lubricant compositions comprise the polyester base oil and one or more additives including anti-wear agents, corrosion inhibitors, antioxidants, thickeners, detergents, and the like. The lubricants have properties that rival those of commercial products made from nonrenewable hydrocarbon blends or polyol esters and are useful for many practical applications such as internal combustion engine oils, gear lubrication oils, hydraulic oils, compressor oils, metal working fluids, and lubricating greases.

24 Claims, No Drawings

(56) References Cited

U.S. PATENT DOCUMENTS

| | | |
|---|---|---|
| 2006/0135665 A1 | 6/2006 | Hansel et al. |
| 2006/0205909 A1* | 9/2006 | O'Brien ............... C08G 18/12 528/44 |
| 2009/0131625 A1 | 5/2009 | Kurian et al. |
| 2013/0131247 A1 | 5/2013 | Daute et al. |
| 2016/0053050 A1* | 2/2016 | Tabor ................... C08G 18/12 524/591 |
| 2016/0122471 A1 | 2/2016 | Bae et al. |

FOREIGN PATENT DOCUMENTS

| | | |
|---|---|---|
| GB | 824249 A | 11/1959 |
| JP | 11293267 A | 10/1999 |
| JP | 2000256274 A | 9/2000 |
| WO | 2000075252 A1 | 12/2000 |
| WO | 2016/028492 A1 | 2/2016 |

OTHER PUBLICATIONS

T. Mang and W. Dresel, eds., Lubricants and Lubrication, 2d Ed., Wiley (2007), pp. 71-76; 230-233; 296-299; and 353-360.
Paszun, D. et al., Ind. Eng. Chem. Res. 36 (1997) 1373.
Ikladious, N., J. Elast. Plast. 32 (2000) 140.
Troev, K. et al., J. Appl. Polym. Sci. 90 (2003) 1148.
PCT International Search Report and Written Opinion dated Oct. 20, 2017 from corresponding Application No. PCT/US2017/04550, 12 pages.

\* cited by examiner

SUSTAINABLE BASE OILS FOR LUBRICANTS

This application is a CON of PCT/US17/45500, filed Aug. 4, 2017 which claims benefit of 62/381,039, filed Aug. 30, 2016.

FIELD OF THE INVENTION

The invention relates to lubricant compositions and methods of formulating them. The lubricant compositions are based in part on recycled thermoplastic polyesters such as polyethylene terephthalate or polybutylene terephthalate.

BACKGROUND OF THE INVENTION

It is hard to imagine a world without lubricants. With no cars, boats, airplanes (or even bicycles) to transport us, without tractors to plant and process crops, without machines to process metal and plastics into everyday containers, without HVAC systems to keep us comfortable, without refrigerators to keep our food fresh, and without the lubricants needed for almost all of our creature comforts, our lives would grind to a halt. Indeed, we would quickly revert to pre-Industrial Revolution status. Such is the importance of the humble lubricant.

Lubricants help to separate moving parts, reduce friction, transfer heat, remove contaminants, transmit power, protect against wear and corrosion, and provide a seal to keep gases in or out. Because lubricants are so ubiquitous and serve so many different functions, they come in many varieties and have properties well-suited to meet the demands of a particular application. Most lubricants include a "base oil" and other components. Most base oils are paraffinic, naphthenic, or aromatic mixtures that derive from petroleum and thus depend on the availability of non-renewable resources.

Various synthetic oils are known, including poly(alpha-olefin)s, synthetic esters, polyalkylene glycols, phosphate esters, and other materials. Many of these materials are designed for special needs that cannot be satisfied by hydrocarbon lubricants.

Polyol esters and other esters of mono-, di-, or polycarboxylic acids have been used for some lubricant applications. The ester functionality provides thermal stability helpful for some uses. Usually, the polyol esters are built from typical low-molecular-weight building blocks that are staples of the chemical industry and most frequently come from petrochemicals. In some cases, vegetable oils have been used as a source of raw materials.

Waste thermoplastic polyesters, including waste polyethylene terephthalate (PET) streams (e.g., from plastic beverage containers), provide an abundant source of raw material for making new polymers. Usually, when PET is recycled, it is used to make new PET beverage bottles, PET fiber, or it is chemically transformed to produce polybutylene terephthalate (PBT). Ideally, these recycled materials could find other applications outside the field of thermoplastic polyesters. Lubricants provide a largely unexplored yet diverse field into which these recycled materials can be re-purposed and up-cycled.

SUMMARY OF THE INVENTION

In one aspect, the invention relates to a method for formulating a sustainable lubricant composition. The lubricant composition comprises a polyester base oil. The base oil comprises recurring units from a digested thermoplastic polyester, a low-molecular-weight polyol, and $C_8$-$C_{24}$ fatty acid. The base oil has a number-average molecular weight within the range of 300 to 5000 g/mol, a hydroxyl value less than 50 mg KOH/g, and a viscosity at 40° C. less than 5000 cSt.

In another aspect, the invention relates to a sustainable lubricant composition. The lubricant composition comprises 90 to 99.9 wt. % of a polyester base oil as described above and 0.1 to 10 wt. % of at least one additive. The additive is an anti-wear agent, corrosion inhibitor, antioxidant, viscosity modifier, thickener, pour-point depressant, detergent, dispersant, antifoam agent, emulsifier, demulsifier, dye, friction modifier, another lubricant, or a mixture thereof.

Sustainable lubricants can be made from recycled thermoplastic polyesters and other reclaimed or biorenewable reactants. Surprisingly, the inventive lubricants have properties that rival those of commercial products made from nonrenewable hydrocarbon blends or polyol esters. The lubricants are useful for a wide variety of practical applications, including (among other applications) internal combustion engine oils, gear lubrication oils, hydraulic oils, compressor oils, metal working fluids, and lubricating greases.

DETAILED DESCRIPTION OF THE INVENTION

In one aspect, the invention relates to method for formulating a sustainable lubricant composition which comprises a polyester base oil. A series of activities is normally involved in "formulating" a lubricant composition. The target application and necessary physical and chemical properties of the lubricant are identified. The available sustainable (recycled, reclaimed, biorenewable) starting materials are also identified. A polyester base oil is then designed having molecular weight, hydroxyl functionality, and viscosity characteristics within a targeted range. The polyester base oil is then synthesized and combined with any other additives needed for the particular application.

The Polyester Base Oil

The polyester base oil comprises recurring units from a digested thermoplastic polyester, a low-molecular-weight polyol, and a $C_8$-$C_{24}$ fatty acid.

Thermoplastic Polyester

Thermoplastic polyesters suitable for use in making the polyester base oils are well known in the art. They are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); polyhydroxy alkanoates, e.g., polyhydroxybutyrate; copolymers of diols with 2,5-furandicarboxylic acid or dialkyl 2,5-furandicarboxylates, e.g., polyethylene furanoate; copolymers of 2,2,4,4-tetramethyl-1,3-cyclobutanediol with isophthalic acid, terephthalic acid or orthophthalic derivatives; dihydroferulic acid polymers; and the like, and mixtures thereof. Further examples of polyester thermoplastics are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters may be found in Chapters 18-20 of *Handbook of Thermoplastics*, O. Olabisi, ed., 1997, Marcel Dekker, Inc., New York. Suitable thermoplastic polyesters include virgin polyesters, recycled polyesters, or mixtures thereof. Polyethylene terephthalate is particularly preferred, especially recycled polyethylene terephthalate (rPET), virgin PET, and mixtures thereof. For more examples of suitable thermoplastic polyesters, see U.S. Pat. Appl. Publ. No. 2009/0131625, the teachings of which are incorporated herein by reference. In preferred aspects, the thermoplastic polyester is polyethylene terephthalate, glycol-modified polyethylene terephthalate, polybutylene terephthalate, or combinations thereof.

Recycled polyethylene terephthalate suitable for use in making the polyester base oils can come from a variety of sources. The most common source is the post-consumer waste stream of PET from plastic bottles or other containers. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

In some aspects, the polyester base oil comprises, based on the amount of polyester base oil, 5 to 40 wt. %, 10 to 35 wt. %, or 15 to 30 wt. % of recurring units from the digested thermoplastic polyester.

Low-Molecular-Weight Polyol

The polyester base oils comprise recurring units of a low-molecular-weight polyol. Low-molecular-weight polyols suitable for use are well known. By "low-molecular-weight polyol," we mean a linear or branched, aliphatic or cycloaliphatic compound or mixture of compounds having two or more hydroxyl groups and having a number-average molecular weight less than 500. Other functionalities, particularly ether or ester groups, may be present in the low-molecular-weight polyol. In preferred polyols, two of the hydroxyl groups are separated by from 2 to 10 carbons, preferably 2 to 5 carbons. Suitable low-molecular-weight polyols include, for example, ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 2,2,4,4-tetramethyl-1,3-cyclobutanediol, 3-methyl-1,5-pentanediol, 1,4-cyclohexanedimethanol, 1,3-cyclohexanedimethanol, bisphenol A ethoxylates, diethylene glycol, dipropylene glycol, triethylene glycol, 1,6-hexanediol, tripropylene glycol, tetraethylene glycol, polyethylene glycols having a number-average molecular weight up to about 500 g/mol, block or random copolymers of ethylene oxide and propylene oxide, and the like, and mixtures thereof. In some aspects, the low-molecular-weight polyol is glycerin, propylene glycol, neopentyl glycol, or a mixture thereof. In some aspects, the low-molecular-weight polyol is a recycled polyol, especially recycled propylene glycol or reclaimed glycerin. Propylene glycol recovered from used deicing fluids and glycerin recovered from biodiesel manufacture are two examples.

In some aspects, the polyester base oil comprises, based on the amount of polyester base oil, 5 to 50 wt. %, 10 to 45 wt. %, or 15 to 40 wt. % of recurring units from the low-molecular-weight polyol.

The $C_8$-$C_{24}$ Fatty Acid

The polyester base oils also comprise recurring units of a $C_8$-$C_{24}$ fatty acid, preferably a $C_8$-$C_{18}$ fatty acid. The $C_8$-$C_{24}$ fatty acid is monofunctional and serves as a chain terminator. Suitable $C_8$-$C_{24}$ fatty acids are well known and many occur naturally in fats and oils. The $C_8$-$C_{24}$ fatty acid can be saturated, monounsaturated, or polyunsaturated. Examples include octanoic acid, nonanoic acid, decanoic acid, lauric acid, myristic acid, palmitic acid, stearic acid, myristoleic acid, palmitoleic acid, oleic acid, ricinoleic acid, linoleic acid, linolenic acid, and the like, and mixtures thereof.

In some aspects, the polyester base oil comprises, based on the amount of polyester base oil, 10 to 90 wt. %, 20 to 80 wt. %, or 30 to 70 wt. % of recurring units from the $C_8$-$C_{24}$ fatty acid.

Other Components

The polyester base oil can include recurring units of other reactants. For instance, in some aspects, the base oil includes recurring units from a $C_4$-$C_{36}$ dicarboxylic acid, anhydride, or ester. A dicarboxylic acid, anhydride, or ester can be included to modify viscosity, adjust polarity, boost molecular weight, or alter other properties of the base oil. The $C_4$-$C_{36}$ dicarboxylic acid, anhydride, or ester is particularly helpful for increasing the molecular weight of the polyester base oil. Aliphatic and aromatic, saturated and unsaturated compounds can be used. Suitable $C_4$-$C_{36}$ dicarboxylic acids, anhydrides, and esters include, for example, succinic acid, succinic anhydride, dialkyl succinates, maleic acid, maleic anhydride, dialkyl maleates, fumaric acid, dialkyl fumarates, glutaric acid, dialkyl glutarates, itaconic acid, itaconic anhydride, phthalic acid, phthalic anhydride, isophthalic acid, 1,5-furandicaboxylic acid, adipic acid, dialkyl adipates, suberic acid, azelaic acid, sebacic acid, cyclohexane dicarboxylic acids, dodecanedioic acid, 1,18-octadecanedioic acid, 1,18-octadec-9-enoic acid, and the like, and mixtures thereof.

In some aspects, the polyester base oil comprises, based on the amount of polyester base oil, 10 to 60 wt. %, 15 to 50 wt. %, or 20 to 40 wt. % of recurring units from the $C_8$-$C_{24}$ fatty acid.

The polyester base oil can also include recurring units of a dimer fatty acid, trimer fatty acid, or mixture thereof (hereinafter, collectively "dimer fatty acid"). Dimer fatty acids are chemical intermediates made by dimerizing unsaturated fatty acids (e.g., oleic acid, linoleic acid, linolenic acid, ricinoleic acid) in the presence of a catalyst, such as a bentonite or montmorillonite clay. Commercially available dimer fatty acids are usually mixtures of products in which the dimerized product predominates. Some commercial dimer acids are made by dimerizing tall oil fatty acids. Dimer fatty acids frequently have 36 carbons and two carboxylic acid groups. They may be saturated or unsaturated. They may also be hydrogenated to remove unsaturation. In a preferred aspect, the dimer fatty acid comprises dimerized oleic acid, trimerized oleic acid, dimerized linoleic acid, trimerized linolelic acid, dimerized linolenic acid, trimerized linolenic acid, or mixtures thereof. Suitable dimer fatty acids include Pripol™ dimer fatty acids (products of Croda) such as Pripol™ 1006, 1009, 1010, 1012, 1013, 1017, 1022, 1025, 1027, 1029, 1036, and 1098; Unidyme™ dimer acids (products of Arizona Chemical) such as Unidyme 10, 14, 18, 22, 35, M15, and M35; dimer acids available from Emery Oleochemicals, and FloraDyme™ dimer acids from Florachem Corporation.

Methods for synthesizing dimer fatty acids suitable for use are also known. Fatty acids having at least one carbon-carbon double bond are dimerized in the presence of a catalyst such as a montmorillonite, kaolinite, hectorite, or attapulgite clay (see, e.g., U.S. Pat. Nos. 2,793,220, 4,371,469, 5,138,027, and 6,281,373, the teachings of which are incorporated herein by reference; see also WO 2000/075252 and CA 104511).

In some aspects, the polyester base oil comprises, based on the amount of polyester base oil, 5 to 20 wt. %, 7 to 18 wt. %, or 10 to 15 wt. % of recurring units from the dimer fatty acid.

The inventive polyester base oils have number-average molecular weights, as measured by gel permeation chromatography or other suitable techniques, within the range of 300 to 5000 g/mol, or in some aspects, within the range of 500 to 3500 g/mol. The base oils have hydroxyl values less than 50 mg KOH/g, or in some aspects, less than 30 mg KOH/g. The base oils have viscosities measured at 40° C. less than 5000 cSt, or in some aspects within the range of 2 to 3500 cSt.

In some aspects, the polyester base oil is made in two steps. In a first step, the thermoplastic polyester and the low-molecular-weight polyol (or polyols) are heated, optionally in the presence of a catalyst, to give a digested intermediate. The digested intermediate will commonly be a mixture of the low-molecular-weight polyol reactant, glycol(s) generated from the thermoplastic polyester, terephthalate oligomers, and other glycolysis products. For example, when PET or rPET is the thermoplastic polyester, the digested intermediate will include a mixture of low-molecular-weight polyol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140). Heating is advantageously performed at temperatures within the range of 80° C. to 260° C., preferably 100° C. to 240° C., more preferably 130° C. to 210° C., and most preferably 160° C. to 185° C.

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, or other metals. Specific examples include titanium alkoxides (e.g., tetrabutyl titanate), titanium(IV) phosphate, zirconium alkoxides, zinc acetate, lead acetate, cobalt acetate, manganese(II) acetate, antimony trioxide, germanium oxide, or the like, and mixtures thereof. The amount of catalyst used is typically in the range of 0.005 to 5 wt. %, preferably 0.01 to 1 wt. %, more preferably 0.02 to 0.7 wt. %, based on the total amount of polyester base oil being prepared.

Usually, the digestion reaction is performed by heating the thermoplastic polyester, the low-molecular-weight polyol(s), and any catalyst at least until the mixture liquefies and particles of the thermoplastic polyester are no longer apparent. Reaction times range from about 30 minutes to about 16 hours, more typically 1 to 10 hours, even more typically 3 to 8 hours, and will depend on the reaction temperature, source of the thermoplastic polyester, the particular low-molecular-weight polyol reactant used, mixing rate, desired degree of depolymerization, and other factors that are within the skilled person's discretion.

In some aspects, the molar ratio of low-molecular-weight polyol to thermoplastic polyester is at least 2.0, preferably 2.0 to 6.0, more preferably 2.5 to 4.5.

In a second step, the digested intermediate produced as described above is reacted with the $C_8$-$C_{24}$ fatty acid and any other carboxylic acid components, such as the $C_4$-$C_{36}$ dicarboxylic acid, anhydride, or ester, or the dimer fatty acid, also described earlier.

The reaction between the digested intermediate and the $C_8$-$C_{24}$ fatty acid and any other carboxylic acid components is performed under conditions effective to promote condensation between hydroxyl groups present in the digested intermediate and carboxylic acid (or acid derivative) groups of the $C_8$-$C_{24}$ fatty acid and any other carboxylic acid components. This reaction is preferably performed by heating at temperatures within the range of 80° C. to 260° C., preferably 100° C. to 240° C., more preferably 130° C. to 230° C., and most preferably 160° C. to 210° C. Water generated in this reaction is advantageously removed from the reaction mixture as it forms. On a lab scale, it is convenient to use a Dean-Stark trap or similar apparatus to remove the water of reaction, but other means will be more practical on a larger scale. Continuous processes for water removal, such as vacuum stripping, wiped-film evaporation, and the like, may be desirable. The condensation reaction is normally continued until a pre-determined amount of water has been collected or a target acid number and/or hydroxyl number is reached for the product.

In other aspects, the polyester base oil is made in a single step by reacting the thermoplastic polyester, the low-molecular-weight polyol, and the $C_8$-$C_{24}$ fatty acid and any other reaction components under conditions effective to produce the polyester base oil. Usually, however, it will be preferred to use the two-step process described previously.

The invention includes lubricant compositions that comprise the polyester base oils and other lubricant components. In one aspect, the composition comprises 90 to 99.9 wt. % or 90 to 98 wt. %, based on the amount of lubricant composition, of the polyester base oil, and 0.1 to 10 wt. % or 2 to 10 wt. %, based on the amount of lubricant composition, of at least one additive. The additive is selected from anti-wear agents, corrosion inhibitors, antioxidants, viscosity modifiers, thickeners, pour-point depressants, detergents, dispersants, antifoam agents, emulsifiers, demulsifiers, dyes, friction modifiers, other lubricants, and the like, and mixtures thereof.

In some aspects, an anti-wear agent is included. When used, the anti-wear agent is included in an amount within the range of 0.1 to 5 wt. %, or 0.5 to 2 wt. %. Suitable anti-wear agents are well known. One example is Lubrizol 1371, phosphorodithionic acid, O,O-bis(1,3-dimethylbutyl and isopropyl ester), zinc salt, which has the structure shown below. An anti-wear agent can be included to help the polyester base oil resist breakdown under the severe load and wear conditions in which lubricants need to function. The presence of an anti-wear agent can impact important lubricant properties, such as ball scar diameter, coefficient of friction, weld point, and other properties.

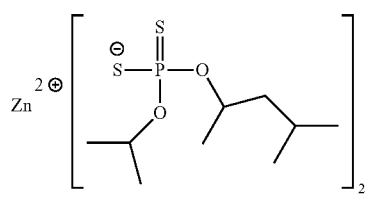

The polyester base oils and lubricant compositions produced from them are useful in a wide variety of applications. In some aspects, the base oil is formulated for use in internal combustion engines, gear lubrication, hydraulic oils, compressor oils, turbine oils, metal working fluids, rolling fluids, quenching fluids, rust prevention oils, forming lubricants, lubricating greases, and the like. Thus, in some aspects, the invention includes an internal combustion engine oil, gear lubrication oil, hydraulic oil, compressor oil, turbine oil, metal working fluid, rolling fluid, quenching fluid, rust prevention oil, forming lubricant, lubricating grease, or the like that comprises a polyester base oil or lubricant composition as described herein.

Lubricant compositions comprising the polyester base oils have desirable lubricant properties, as determined by standard test methods. In some aspects, the compositions have average ball scar diameters (by ASTM D4172) less than 1.0 mm or less than 0.8 mm in the absence of an anti-wear additive, and less than 0.5 mm or less than 0.4 mm when an anti-wear additive is included. In some aspects, the compositions have an average coefficient of friction (by ASTM D4172) less than 0.1, or in other aspects, less than 0.08. In other aspects, the lubricant compositions have last non-seizure loads (by ASTM D2783) of at least 40 kg, or in other aspects, at least 50 kg or at least 100 kg. In other aspects, the lubricant compositions have weld points (by ASTM D2783) of at least 150 kg, or in other aspects, at least 200 kg. In still other aspects, the lubricant compositions have a load wear index (by ASTM D2783) of at least 20, or in other aspects, at least 35.

The following examples merely illustrate the invention; the skilled person will recognize many variations that are within the spirit of the invention and scope of the claims.

Polyester Base Oil Syntheses

Polyester Base Oil A

A 4-neck round-bottom flask equipped with overhead mixing, reflux condenser, nitrogen flow, heating mantle, and temperature controller is charged with post-industrial poly(ethylene terephthalate) (12.42 pbw), propylene glycol (6.62 pbw), and glycerin (8.27 pbw). Mixing commences, and the mixture is heated to 220° C. under a flow of nitrogen. Titanium(IV) butoxide (0.10 pbw) is added when the pot temperature exceeds 100° C. to prevent catalyst deactivation by water. The reactor contents are mixed at 220° C. for 4-6 hours until few solids remain. The reactor is cooled and the reflux condenser is replaced with a five-plate vacuum-jacketed column and short-path distillation head. Decanoic acid (72.59 pbw) is added and the reaction mixture is heated to 220° C. for 10-12 h, during which time water distills from the reactor and the esterification reaction proceeds. Nitrogen flow is increased to aid in water removal. When the acid number is less than 5 mg KOH/g, the reaction is considered complete, and the product is cooled. The final product is filtered through a fine glass frit, collected, and characterized. Viscosity (40° C.): 32 cSt; Mn: 504 g/mol; hydroxyl number: 10.7 mg KOH/g; acidity: 0.6 mg KOH/g; average branching: 2.5; density: 0.964 g/mL.

Polyester Base Oil B

The procedure used for Polyester Base Oil A is generally followed using polyethylene terephthalate (13.20 pbw), propylene glycol (7.03 pbw), glycerin (8.79 pbw), and nonanoic acid (70.88 pbw) instead of decanoic acid. The final product is isolated and characterized as described earlier. Viscosity (40° C.): 29 cSt; Mn: 472 g/mol; hydroxyl number: 6.1 mg KOH/g; acidity: 1.5 mg KOH/g; average branching: 2.5; density: 0.980 g/mL.

Polyester Base Oil C

The procedure used for Polyester Base Oil A is generally followed using polyethylene terephthalate (12.32 pbw), glycerin (14.21 pbw), decanoic acid (73.37 pbw), and no propylene glycol. Viscosity (40° C.): 56 cSt; Mn: 572 g/mol; hydroxyl number: 23.0 mg KOH/g; acidity: 1.4 mg KOH/g; average branching: 3.0; density: 0.978 g/mL.

Polyester Base Oil D

The procedure used for Polyester Base Oil A is generally followed using polyethylene terephthalate (9.62 pbw), glycerin (9.73 pbw), oleic acid (80.55 pbw) instead of decanoic acid, and no propylene glycol. Viscosity (40° C.): 89 cSt; Mn: 827 g/mol; hydroxyl number: 14.5 mg KOH/g; acidity: 1.2 mg KOH/g; average branching: 3.0; density: 0.948 g/mL.

Polyester Base Oil E

The procedure used for Polyester Base Oil D is generally followed using polybutylene terephthalate (10.88 pbw) instead of PET, glycerin (9.60 pbw), and oleic acid (79.37 pbw). Viscosity (40° C.): 218 cSt; Mn: 828 g/mol; hydroxyl number: 1.7 mg KOH/g; acidity: 5.6 mg KOH/g; average branching: 3.0; density: 0.944 g/mL.

Polyester Base Oil F

The procedure used for Polyester Base Oil A is generally followed using polyethylene terephthalate (9.35 pbw), glycerin (9.45 pbw), oleic acid (71.4 pbw) instead of decanoic acid, and no propylene glycol. Additionally, Pripol™ 1025 dimer fatty acid (9.73 pbw, product of Croda) is introduced with the oleic acid. Viscosity (40° C.): 153 cSt; Mn: 720 g/mol; hydroxyl number: 12.2 mg KOH/g; acidity: 4.0 mg KOH/g; average branching: 3.0; density: 0.950 g/mL.

Polyester Base Oil G

The procedure used for Polyester Base Oil A is generally followed using polyethylene terephthalate (18.01 pbw), propylene glycol (22.12 pbw), neopentyl glycol (5.14 pbw), decanoic acid (11.77 pbw), adipic acid (42.96 pbw), and no glycerin. The neopentyl glycol is charged with the propylene glycol and the adipic acid is introduced with the decanoic acid. Viscosity (40° C.): 3970 cSt; Mn: 1926 g/mol; hydroxyl number: 14.6 mg KOH/g; acidity: 2.3 mg KOH/g; average branching: 2.0; density: 1.136 g/mL.

Polyester Base Oil H

The procedure used for Polyester Base Oil G is generally followed using polyethylene terephthalate (5.42 pbw), propylene glycol (26.17 pbw), neopentyl glycol (5.57 pbw), decanoic acid (11.12 pbw), and adipic acid (51.72 pbw). Viscosity (40° C.): 2229 cSt; Mn: 1992 g/mol; hydroxyl number: 13.5 mg KOH/g; acidity: 2.6 mg KOH/g; average branching: 2.0; density: 1.117 g/mL.

Evaluation in Lubricant Testing

ASTM D2783 ("Measurement of Extreme-Pressure Properties of Fluid Lubricants") and a Falex four-ball extreme pressure instrument (Falex Corp., Sugar Grove, Ill.) are used to evaluate certain lubricant properties. Test parameters are as follows: speed 1760 rpm; temperature: 23° C.; duration: 10 s/stage; applied load: varies for each stage and can range from 6 to 800 kg. Test specimens: ball material: AISI-E52100; hardness (HRc) 64-66; grade: 25EP.

Each tested lubricant is evaluated for last non-seizure load, weld point, and load wear index. Last non-seizure load (LNSL), measured in kilograms, is defined as the last load at which the measured ball scar diameter is not more than 5% above the compensation line at the load. Beyond this point, incipient seizure occurs, indicating momentary breakdown of the lubricating film. Weld point is the lowest applied load (in kg) at which the rotating ball welds to the three stationary balls indicating that the extreme-pressure level to the lubricants-force (or Newtons) has been exceeded. Load wear index (LWI) is the load-carrying property of the lubricant. It is an index of the ability of the lubricant to minimize wear at applied loads.

ASTM D4172, Method B ("Wear Preventive Characteristics of Lubricating Fluid") is used to obtain values for average ball scar diameter and average coefficient of friction (CoF). Test parameters are as follows: speed 1200 rpm; temperature: 75° C.; duration: 60 min.; applied load: 40 kgf. Test specimens: ball material: AISI-E52100; hardness (HRc) 64-66; grade: 25EP.

Ball scar diameter is measured for each of the three stationary balls along both x and y axes and an average of the six measurements is reported as average ball scar diameter. The average CoF is found by calculating CoF values from the corresponding friction (g) measurements made at 0, 15, 30, 45, and 60 minutes and then averaging the CoF values.

Results

As shown in Table 1, Polyester Base Oils A-H provide reasonably good results across the range of properties tested even without an anti-wear agent included. However, the results rival or exceed those from commercial lubricants when an anti-wear agent (Lubrizol 1371) is included.

Tables 2-5 illustrate the effect of varying the amount of anti-wear agent used in combination with a PET-based base oil (Polyester Base Oil D) or a PBT-based base oil (Polyester Base Oil E). As shown in Table 2, the overall balance of properties (average ball scar diameter, average coefficient of friction, last non-seizure load, weld point, and load wear index) for the polyester base oils is significantly better than that of the commercial controls even without an anti-wear agent added to the inventive polyester base oil compositions. Commercial formulations (e.g., the blend of Chevron hydrocarbon oils and the Hostagliss™ 1383A polyol ester synthetic base oil) will normally contain one or more anti-wear agents. With 0.5, 1.0, or 1.5 wt. % of an antiwear agent included (Tables 3-5), Polyester Base Oils D and E as base oils provide an overall balance of properties that rivals or exceeds that of the commercial controls.

The preceding examples are meant only as illustrations; the following claims define the inventive subject matter.

TABLE 1

Lubricant Test Results

| Lubricant | Lubrizol 1371 (wt. %) | Ave. Ball Scar Diameter (mm) | Ave. CoF | Last Non-Seizure Load (kg) | Weld point (kg) | Load Wear Index |
| --- | --- | --- | --- | --- | --- | --- |
| Polyester Base Oil A | 0 | 0.850 | 0.083 | 50 | 160 | 22.8 |
| Polyester Base Oil B | 0 | 0.795 | 0.072 | 40 | 160 | 21.7 |
| Polyester Base Oil C | 0 | 0.735 | 0.069 | 50 | 200 | 24.0 |
| Polyester Base Oil C | 1.5 | 0.345 | 0.061 | 100 | 315 | 47.2 |
| Polyester Base Oil D | 1.5 | 0.357 | 0.067 | 100 | 315 | 48.4 |
| Polyester Base Oil F | 0 | 0.318 | 0.052 | 63 | 200 | 32.4 |
| Polyester Base Oil G | 0 | 0.950 | 0.083 | 100 | 200 | 42.2 |
| Polyester Base Oil H | 0 | 0.950 | 0.073 | 100 | 160 | 40.2 |
| Hy-Tran ® fluid | 0 | 0.367 | 0.092 | 63 | 200 | 29.4 |

Hy-Tran ® hydraulic transmission oil, product of Viscosity Oil Co.

TABLE 2

Lubricant Test Results: No Anti-Wear Agent Added

| Lubricant | Lubrizol 1371 (wt. %) | Ave. Ball Scar Diameter (mm) | Ave. CoF | Last Non-Seizure Load (kg) | Weld point (kg) | Load Wear Index |
| --- | --- | --- | --- | --- | --- | --- |
| Polyester Base Oil D | 0 | 0.521 | 0.047 | 63 | 200 | 28.4 |
| Polyester Base Oil E | 0 | 0.593 | 0.064 | 63 | 160 | 27.7 |
| Chevron 220/600 | 0 | 0.841 | 0.106 | 40 | 126 | 17.7 |
| Hostagliss ™ 1383A | 0 | 0.756 | 0.060 | 50 | 160 | 22.4 |

Chevron 220/600 is a 1:1 blend of Chevron 220 and Chevron 600 hydrocarbon lubricating oils, products of Chevron Hostagliss ™ 1383A is a synthetic polyol ester base oil, product of Clariant.

TABLE 3

Lubricant Test Results: 0.5 wt. % Anti-Wear Agent Added

| Lubricant | Lubrizol 1371 (wt. %) | Ave. Ball Scar Diameter (mm) | Ave. CoF | Last Non-Seizure Load (kg) | Weld point (kg) | Load Wear Index |
| --- | --- | --- | --- | --- | --- | --- |
| Polyester Base Oil D | 0.5 | 0.429 | 0.072 | 80 | 250 | 36.9 |
| Polyester Base Oil E | 0.5 | 0.331 | 0.060 | 100 | 200 | 42.2 |
| Chevron 220/600 | 0.5 | 0.479 | 0.102 | 80 | 200 | 35.4 |
| Hostagliss ™ 1383A | 0.5 | 0.631 | 0.060 | 63 | 200 | 29.1 |

TABLE 4

Lubricant Test Results: 1.0 wt. % Anti-Wear Agent Added

| Lubricant | Lubrizol 1371 (wt. %) | Ave. Ball Scar Diameter (mm) | Ave. CoF | Last Non-Seizure Load (kg) | Weld point (kg) | Load Wear Index |
|---|---|---|---|---|---|---|
| Polyester Base Oil D | 1.0 | 0.367 | 0.071 | 80 | 315 | 39.4 |
| Chevron 220/600 | 1.0 | 0.477 | 0.102 | 80 | 200 | 35.7 |
| Hostagliss ™ 1383A | 1.0 | 0.349 | 0.072 | 80 | 250 | 36.7 |

TABLE 5

Lubricant Test Results: 1.5 wt. % Anti-Wear Agent Added

| Lubricant | Lubrizol 1371 (wt. %) | Ave. Ball Scar Diameter (mm) | Ave. CoF | Last Non-Seizure Load (kg) | Weld point (kg) | Load Wear Index |
|---|---|---|---|---|---|---|
| Polyester Base Oil D | 1.5 | 0.406 | 0.072 | 100 | 315 | 48.0 |
| Polyester Base Oil E | 1.5 | 0.387 | 0.070 | 100 | 315 | 47.3 |
| Chevron 220/600 | 1.5 | 0.518 | 0.102 | 100 | 200 | 42.8 |
| Hostagliss ™ 1383A | 1.5 | 0.386 | 0.076 | 80 | 250 | 36.9 |

We claim:

1. A method which comprises formulating a lubricant composition comprising 0.1 to 5 wt. %, based on the amount of lubricant composition, of an anti-wear agent, and a polyester base oil, the base oil comprising recurring units from: (a) a digested thermoplastic polyester selected from the group consisting of polyethylene terephthalate, glycol-modified polyethylene terephthalate, polybutylene terephthalate, and combinations thereof; (b) a low-molecular-weight polyol; and (c) a monofunctional $C_8$-$C_{24}$ fatty acid; wherein the base oil has a number-average molecular weight within the range of 300 to 5000 g/mol, a hydroxyl value less than 50 mg KOH/g, and a viscosity at 40° C. less than 5000 cSt, wherein the lubricant composition has an average ball scar diameter as measured by ASTM D4172 less than 0.5 mm.

2. The method of claim 1 wherein the lubricant composition further comprises 0.1 to 10 wt. %, based on the amount of lubricant composition, of at least one additive selected from the group consisting of corrosion inhibitors, antioxidants, viscosity modifiers, thickeners, pour-point depressants, detergents, dispersants, antifoam agents, emulsifiers, demulsifiers, dyes, friction modifiers, other lubricants, and mixtures thereof.

3. The method of claim 1 wherein the polyester base oil is formulated for use in an application selected from the group consisting of internal combustion engines, gear lubrication, hydraulic oils, compressor oils, turbine oils, metal working fluids, rolling fluids, quenching fluids, rust prevention oils, forming lubricants, and lubricating greases.

4. The method of claim 1 wherein the low-molecular-weight polyol is selected from the group consisting of ethylene glycol, propylene glycol, 1,3-propanediol, 1,2-butylene glycol, 1,3-butylene glycol, 1,4-butanediol, 2,2,4,4-tetramethyl-1,3-cyclobutanediol, 2-methyl-1,3-propanediol, 1,6-hexanediol, pentaerythritol, sorbitol, neopentyl glycol, glycerol, trimethylolpropane, 3-methyl-1,5-pentanediol, 1,4-cyclohexanedimethanol, 1,3-cyclohexanedimethanol, bisphenol A ethoxylates, diethylene glycol, tetraethylene glycol, dipropylene glycol, triethylene glycol, tripropylene glycol, polyethylene glycols having a number-average molecular weight up to about 400 g/mol, block or random copolymers of ethylene oxide and propylene oxide, and mixtures thereof.

5. The method of claim 4 wherein the low-molecular-weight polyol is glycerin, propylene glycol, neopentyl glycol, or a mixture thereof.

6. The method of claim 1 wherein the $C_8$-$C_{24}$ fatty acid is selected from the group consisting of octanoic acid, nonanoic acid, decanoic acid, lauric acid, myristic acid, palmitic acid, stearic acid, myristoleic acid, palmitoleic acid, oleic acid, ricinoleic acid, linoleic acid, linolenic acid, and mixtures thereof.

7. The method of claim 1 wherein the polyester base oil has a number-average molecular weight within the range of 400 to 3000 g/mol.

8. The method of claim 1 wherein the polyester base oil comprises 5 to 40 wt. % of the digested thermoplastic polyester.

9. The method of claim 1 wherein the polyester base oil comprises 10 to 90 wt. % of the $C_8$-$C_{24}$ fatty acid.

10. The method of claim 1 wherein the polyester base oil comprises 5 to 50 wt. % of the low-molecular-weight polyol.

11. The method of claim 1 wherein the polyester base oil has a viscosity at 40° C. within the range of 2 cSt to 3500 cSt.

12. The method of claim 1 wherein the polyester base oil further comprises 10 to 60 wt. %, based on the amount of base oil, of recurring units of a $C_4$-$C_{36}$ dicarboxylic acid, anhydride, or ester.

13. The method of claim 1 wherein the polyester base oil further comprises 5 to 20 wt. %, based on the amount of base oil, of recurring units of a dimer fatty acid, trimer fatty acid, or mixture thereof.

14. A lubricant composition comprising:
(a) 90 to 99.9 wt. % of a polyester base oil comprising recurring units from: (i) a digested thermoplastic polyester selected from the group consisting of polyethylene terephthalate, glycol-modified polyethylene terephthalate, polybutylene terephthalate, and combinations thereof; (ii) a low-molecular-weight polyol; and (iii) a monofunctional $C_8$-$C_{24}$ fatty acid; wherein the base oil has a number-average molecular weight within the range of 300 to 5000 g/mol, a hydroxyl value less than 50 mg KOH/g, and a viscosity at 40° C. less than 5000 cSt; and (b) 0.1 to 10 wt. %, based on the amount of lubricant composition, of an anti-wear agent;

wherein the lubricant composition has an average ball scar diameter as measured by ASTM D4172 less than 0.5 mm.

15. The composition of claim 14 wherein the low-molecular-weight polyol is selected from the group consisting of ethylene glycol, propylene glycol, 1,3-propanediol, 1,2-butylene glycol, 1,3-butylene glycol, 1,4-butanediol, 2,2,4,4-tetramethyl-1,3-cyclobutanediol, 2-methyl-1,3-propanediol, 1,6-hexanediol, pentaerythritol, sorbitol, neopentyl glycol, glycerol, trimethylolpropane, 3-methyl-1,5-pentanediol, 1,4-cyclohexanedimethanol, 1,3-cyclohexanedimethanol, bisphenol A ethoxylates, diethylene glycol, tetraethylene glycol, dipropylene glycol, triethylene glycol, tripropylene glycol, polyethylene glycols having a number-average molecular weight up to about 400 g/mol, block or random copolymers of ethylene oxide and propylene oxide, and mixtures thereof.

16. The composition of claim 14 wherein the $C_8$-$C_{24}$ fatty acid is selected from the group consisting of octanoic acid, nonanoic acid, decanoic acid, lauric acid, myristic acid, palmitic acid, stearic acid, myristoleic acid, palmitoleic acid, oleic acid, ricinoleic acid, linoleic acid, and mixtures thereof.

17. The composition of claim 14 wherein the polyester base oil comprises 5 to 40 wt. % of the digested thermoplastic polyester.

18. The composition of claim 14 wherein the polyester base oil comprises 10 to 90 wt. % of the $C_8$-$C_{24}$ fatty acid.

19. The composition of claim 14 wherein the polyester base oil comprises 5 to 50 wt. % of the low-molecular-weight polyol.

20. The composition of claim 14 wherein the polyester base oil has a viscosity at 40° C. within the range of 2 cSt to 3500 cSt.

21. The composition of claim 14 wherein the polyester base oil further comprises 10 to 60 wt. %, based on the amount of base oil, of recurring units of a $C_4$-$C_{36}$ dicarboxylic acid, anhydride, or ester.

22. The composition of claim 14 wherein the polyester base oil further comprises 5 to 20 wt. %, based on the amount of base oil, of recurring units of a dimer fatty acid, trimer fatty acid, or mixture thereof.

23. An internal combustion engine oil, gear lubrication oil, hydraulic oil, compressor oil, turbine oil, metal working fluid, rolling fluid, quenching fluid, rust prevention oil, forming lubricant, or lubricating grease comprising the lubricant composition of claim 14.

24. The composition of claim 14 further comprising at least one additive selected from the group consisting of corrosion inhibitors, antioxidants, viscosity modifiers, thickeners, pour-point depressants, detergents, dispersants, antifoam agents, emulsifiers, demulsifiers, dyes, friction modifiers, other lubricants, and mixtures thereof.

* * * * *